United States Patent
Tsirkin

(10) Patent No.: US 12,254,338 B2
(45) Date of Patent: Mar. 18, 2025

(54) PRE-ALLOCATING PAGE TABLE ENTRIES TO PROVIDE VIRTUAL MACHINE ACCESS TO SINGLE ROOT INPUT-OUTPUT VIRTUALIZATION DEVICES

(71) Applicant: RED HAT, INC., Raleigh, NC (US)

(72) Inventor: Michael Tsirkin, Haifa (IL)

(73) Assignee: Red Hat, Inc., Raleigh, NC (US)

( * ) Notice: Subject to any disclaimer, the term of this patent is extended or adjusted under 35 U.S.C. 154(b) by 457 days.

(21) Appl. No.: 17/840,909

(22) Filed: Jun. 15, 2022

(65) Prior Publication Data

US 2023/0409367 A1  Dec. 21, 2023

(51) Int. Cl.
G06F 9/48 (2006.01)
G06F 9/455 (2018.01)
G06F 12/02 (2006.01)
G06F 12/1009 (2016.01)

(52) U.S. Cl.
CPC ...... *G06F 9/45558* (2013.01); *G06F 12/0238* (2013.01); *G06F 12/1009* (2013.01); *G06F 2009/45579* (2013.01); *G06F 2009/45583* (2013.01)

(58) Field of Classification Search
CPC .... G06F 3/0662; G06F 9/455; G06F 9/45505; G06F 9/45533; G06F 9/45545; G06F 9/45558
See application file for complete search history.

(56) References Cited

U.S. PATENT DOCUMENTS

| | | | |
|---|---|---|---|
| 9,176,767 B2 | 11/2015 | Cantu | |
| 10,489,302 B1 | 11/2019 | Habusha et al. | |
| 11,544,097 B2 * | 1/2023 | Rugina | G06F 9/45558 |
| 12,105,623 B2 * | 10/2024 | Asaro | G06T 1/60 |
| 2012/0167082 A1 | 6/2012 | Kumar et al. | |

(Continued)

OTHER PUBLICATIONS

Lim, J.T. and Nieh, J., "Optimizing Nested Virtualization Performance Using Direct Virtual Hardware," Columbia University, Mar. 16-20, 2020, https://www.cs.columbia.edu/~nieh/pubs/asplos2020_dvh.pdf.

(Continued)

*Primary Examiner* — Andy Ho
(74) *Attorney, Agent, or Firm* — Kilpatrick Townsend & Stockton LLP

(57) ABSTRACT

Page table entries for a maximum number of virtual functions configurable by a physical function of a single root input-output virtualization (SR-IOV) device can be pre-allocated to provide access for nested virtual machines and containers. For example, a computing device can allocate, by an input-output memory management unit (IOMMU), a page table comprising page table entries to a physical function executed by an SR-IOV device. The number of page table entries can be the maximum number of virtual functions that are configurable by the physical function. A virtual IOMMU executing in a virtual machine deployed by the computing device can map a virtual page table comprising virtual page table entries to the page table comprising page table entries. The virtual machine can assign a virtual function using a virtual page table entry. The virtual page table entry can include a function number and a virtual memory address.

20 Claims, 3 Drawing Sheets

(56) References Cited

U.S. PATENT DOCUMENTS

2016/0132443 A1* 5/2016 Davda ................ G06F 9/45558
710/308
2019/0379731 A1 12/2019 Johnsen et al.
2020/0150987 A1 5/2020 Nair

OTHER PUBLICATIONS

Xu, X. and Davda, B., "SRVM: Hypervisor Support for Live Migration with Passthrough SR-IOV Network Devices," VMware Inc., Apr. 2-3, 2016, https://dl.acm.org/doi/pdf/10.1145/2892242.2892256?download=true.

* cited by examiner

PRE-ALLOCATING PAGE TABLE ENTRIES TO PROVIDE VIRTUAL MACHINE ACCESS TO SINGLE ROOT INPUT-OUTPUT VIRTUALIZATION DEVICES

TECHNICAL FIELD

The present disclosure relates generally to virtual machines. More specifically, but not by way of limitation, this disclosure relates to pre-allocating page table entries for virtual functions to provide virtual machine access to single root input-output virtualization devices.

BACKGROUND

Virtualization may be used to provide some physical components as logical objects in order to allow running various software modules, concurrently and in isolation from other software modules, on a computing device or a collection of connected computing devices. Virtualization may allow, for example, for consolidating multiple physical servers into one physical server running multiple guest virtual machines in order to improve the hardware utilization rate. A virtual machine can be a substantially isolated environment that has its own operating system, software applications, and virtualized hardware. For example, a virtual machine can have a virtual Central Processing Unit (vCPU), a virtual Random Access Memory (vRAM), and other components.

Virtualization may be achieved by running a software layer, often referred to as a hypervisor, to manage processor resources allocated to guest virtual machines. A guest virtual machine may itself provide virtual machines and therefore may include its own hypervisor. The top-level hypervisor is often referred to as the host hypervisor and a hypervisor for a nested virtualization environment can be referred to as a nested hypervisor.

A hypervisor may virtualize the physical layer and provide interfaces between the underlying hardware and guest virtual machines and any guest operating systems. The hypervisor can use these interfaces to manage resources given to applications running on a guest virtual machine.

DETAILED DESCRIPTION

Figure 1:
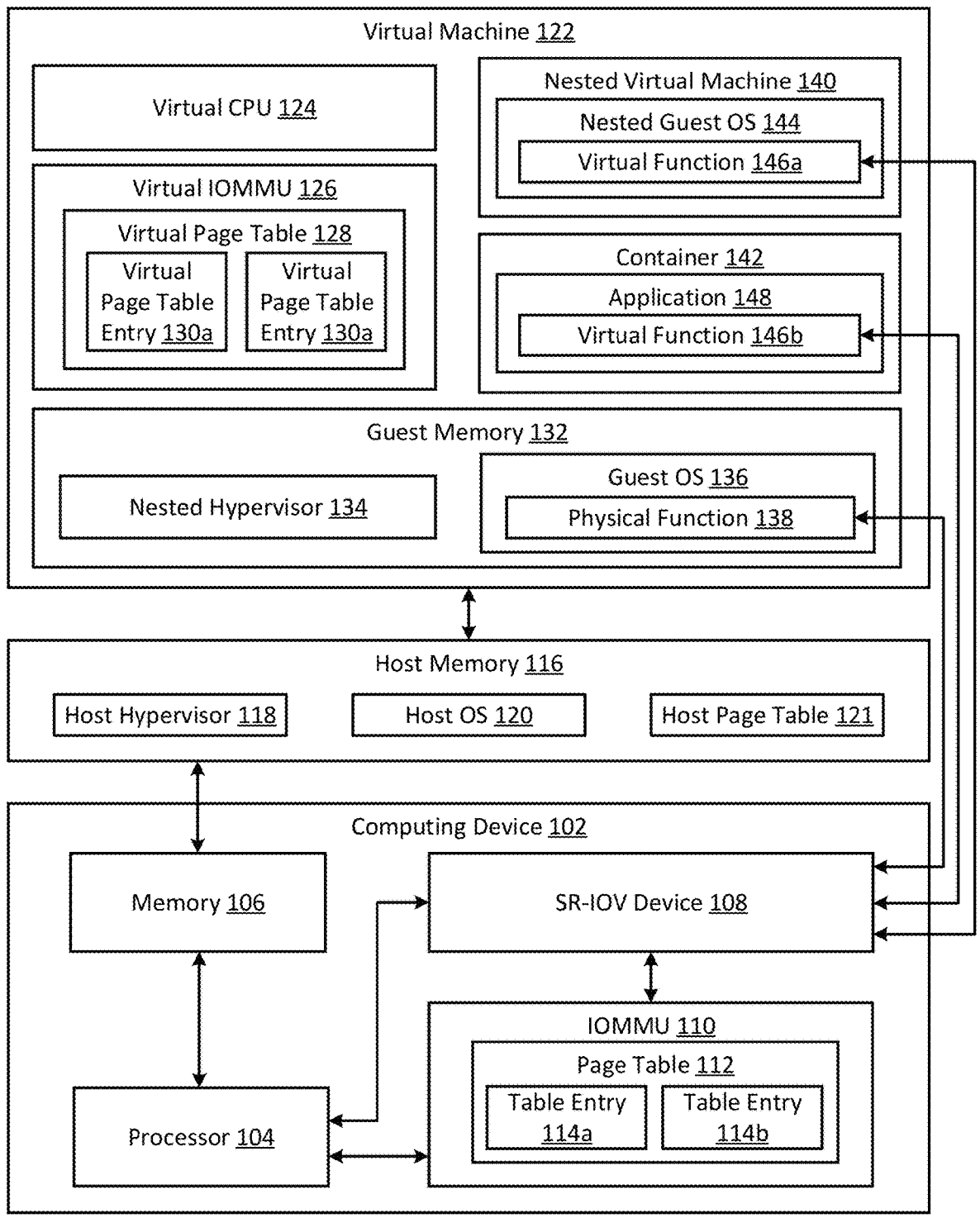
FIG. 1 is a block diagram of an example of a system for pre-allocating page table entries for virtual functions to provide virtual machine access to a single root input-output virtualization (SR-IOV) device according to some aspects of the present disclosure.

Computing environments may utilize peripheral component interface (PCI) devices, such as network interface cards. Some PCI devices have single root input-output virtualization (SR-IOV) capabilities that allow the PCI device to separate access to its resources via PCI hardware functions. The PCI hardware functions include a physical function, which is the primary function used to manage the PCI device, and one or more virtual functions associated with the physical function. The physical function and virtual functions can be passed by a hypervisor to guest virtual machines executing on the computing environment to provide PCI device access to the virtual machines. But, nested virtual machines may not have access to the SR-IOV capabilities of the PCI device even if the physical function is passed via the hypervisor, as virtual functions are created after a physical function driver is loaded in the first virtual machine. Additionally, page tables indexing memory locations for the virtual functions are not created, since they are indexed by the function number of the virtual function. With no page table entries for the virtual functions in the host memory of the computing device, a top-level virtual machine may be unable to access the memory required to enable or disable virtual functions in nested virtual machines or containers.

Some examples of the present disclosure can overcome one or more of the abovementioned problems by pre-allocating page table entries for the maximum number of virtual functions executable by the physical function of an SR-IOV enabled PCI device (also referred to herein as an SR-IOV device). The page table entries may be pre-allocated in an input-output memory management unit (IOMMU) of the computing device. When a virtual machine is deployed by a host hypervisor of the computing device, the virtual machine may include a virtual IOMMU with pre-allocated virtual page table entries. Because the virtual machine is aware of all potential virtual functions that may be created by the computing device due to the pre-allocated virtual page table entries, the virtual machine may send a request to create a virtual function. The request may be intercepted and forwarded by the host hypervisor to the SR-IOV device to create the virtual function. In this way, access to the SR-IOV capabilities of the PCI device can be provided to the virtual machine. Pre-allocating the page table entries for the virtual functions may allow for increased utilization of the SR-IOV device, without increasing memory usage or latency of the computing device.

In one particular example, a computing device can include an SR-IOV device and an IOMMU. The SR-IOV device may be configurable by a physical function that can also configure a number of virtual functions. The physical function for the SR-IOV device can be executed by the computing device. The IOMMU may create a page table for the physical function. The computing device can query the SR-IOV device for the maximum number of virtual functions that can be configured by the physical function. Rather than creating page tables or page table entries for virtual functions as the virtual functions are created, the IOMMU can instead allocate a page table entry corresponding to each potential virtual function within the page table associated with the physical function. Therefore, the number of page table entries can correspond to the maximum number of virtual functions that can be configured by the physical function. Each page table can include a function number for a potential virtual function.

The computing device can run a host hypervisor for provisioning one or more virtual machines. The host hypervisor can be a software layer that is conceptually positioned above a physical layer (e.g., the hardware) of the computing device and below the virtual machine. The host hypervisor can interface between the physical layer and the virtual machine. The physical layer can include an SR-IOV device, such as a network interface card, and an IOMMU. The virtual machine may include virtualized resources, such as a virtual IOMMU, a virtual SR-IOV device, and a virtual hypervisor (also referred to herein as a nested hypervisor). The virtual IOMMU may include the virtual pre-allocated page table entries. In some examples, the virtual machine may execute the nested hypervisor to deploy and control nested virtual machines and containers within the virtual machine.

To enable virtual machine access to the SR-IOV device, the virtual machine may send a request to create a virtual function. The host hypervisor may intercept the request and may forward the request to the SR-IOV device. The SR-IOV device may create the virtual function. The IOMMU can update a page table associated with the created virtual function with an SR-IOV device memory address. The host hypervisor can translate the SR-IOV device memory address into a virtual SR-IOV device memory address for the virtual SR-IOV and pass the virtual SR-IOV device memory address to the virtual machine to enable the virtual function. In some examples, the virtual function may be assigned to and controlled by a nested virtual machine deployed within the virtual machine. Additionally or alternatively, the virtual function may be assigned to and controlled by an application, such as an application within a container that is deployed by the virtual machine. In some examples, multiple virtual functions can be assigned to nested virtual machines and containers.

Alternatively, the request may be intercepted and forwarded to the SR-IOV by a processor in the computing device. After the SR-IOV device creates the virtual function, the processor may translate the SR-IOV device memory into the virtual SR-IOV device memory address. The processor can store the SR-IOV device memory address and the virtual SR-IOV device memory address in a host page table in the memory of the computing device. The processor may access the host page table to transmit the SR-IOV device memory address to the virtual machine to enable the virtual function.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for pre-allocating page table entries 114 for virtual functions 146 to provide virtual machine 122 access to a single root input-output virtualization (SR-IOV) device 108 according to some aspects of the present disclosure. More specifically, the system includes a computing device 102. In some examples, the computing device 102 can implement nodes in a distributed computing network. The computing device 102 can execute software as defined below, which causes the computing device 102 to perform the tasks of providing a host hypervisor 118 in host memory 116 that resides in memory 106. The host memory 116 can also include a host operating system (OS) 120. The computing device 102 can include a processor 104, a memory 106, an SR-IOV device 108, and an input-output memory management unit (IOMMU) 110. The SR-IOV device 108 may be a peripheral component interface (PCI) card, such as a network interface card, that is plugged into a PCI module (not pictured) of the computing device 102.

The computing device 102 can run a virtual machine 122 by executing the host hypervisor 118 and the host OS 120. In some examples, the host OS 120 can execute the host hypervisor 118. In other examples, the computing device 102 can execute the host hypervisor 118 separately from, or exclusive of, the host OS 120. The host hypervisor 118 can virtualize the physical layer, including processors, memory devices, I/O devices, etc. and present this virtualization to the virtual machine 122 as devices, including virtual processors, virtual memory devices, and virtual I/O devices. The virtual machine 122 may run any type of dependent, independent, and compatible applications on the underlying hardware and host OS 120. In this example, the virtual machine 122 is executing a guest OS 136 that resides in guest memory 132, which may utilize underlying hardware, referred to herein as a virtual central processing unit (CPU) 124 and a virtual IOMMU 126.

The virtual machine 122 can include a nested hypervisor 134 that resides in guest memory 132. In the same manner as described above, the virtual machine 122 can execute the nested hypervisor 134 to deploy a nested virtual machine 140 within the virtual machine 122. The nested virtual machine 140 may include nested virtualized resources, including a nested guest OS 144. The virtual machine 122 may also execute the nested hypervisor 134 to run a container 142 within the virtual machine 122. The container 142 may include an application 148 that can execute within the virtual machine 122.

The SR-IOV capabilities of the SR-IOV device 108 may be accessed using SR-IOV device functions, including a physical function 138 and one or more virtual functions 146. In some examples, the physical function 138 may reside in host memory 116, such as in the host OS 120. Alternatively, the physical function 138 may be passed to the virtual machine 122, and may reside in the guest OS 136 of guest memory 132. To provide the virtual machine 122 access to the SR-IOV capabilities, a page table 112 may be created for the physical function 138 before the virtual machine 122 is deployed. Rather than generating separate page tables 112 for virtual functions 146 as they are created, the page table 112 associated with the physical function 138 may include pre-allocated page table entries 114a-b to be used for the virtual functions 146. The number of pre-allocated page table entries 114a-b can be the maximum number of virtual functions 146 supported by the physical function 138. The SR-IOV device 108 can be queried, such as by the processor 104, the host hypervisor 118, the IOMMU 110, or the nested hypervisor 134, for the maximum number of virtual functions 146.

When the virtual machine 122 is deployed, the virtualized layer may include a virtual page table 128 for the physical function 138 and virtual page table entries 130a-b for potential virtual functions 146 that correspond to the pre-allocated page table 112 and page table entries 114a-b. This can allow the virtual machine 122 to be aware of pre-allocated memory for creating and removing virtual functions 146 within the virtualized layer. The virtual machine 122 may send a request to create a virtual function 146. For example, the virtual machine 122 may send the request to a virtual SR-IOV device in the virtual machine 122. Instead of being received by the virtual SR-IOV device, the request may be intercepted and forwarded to the SR-IOV device 108. In one example, the host hypervisor 118 may intercept and forward the request. The SR-IOV device 108 can create the virtual function 146 using memory in the SR-IOV device 108. The IOMMU 110 can update the page table entry 114 corresponding to the virtual function 146 to include a function number and a device memory address in the SR-IOV device 108. The host hypervisor 118 can translate the device memory address into a virtual device memory address to transmit to the virtual machine 122. The virtual machine 122 may use the virtual device memory address to enable the virtual function 146 and may assign the virtual function 146.

Alternatively, the request may be intercepted and forwarded by the processor 104. After the SR-IOV device 108 creates the virtual function 146, the processor 104 can translate the device memory address into a virtual device memory address. The processor 104 can store the mapping between the device memory address and the virtual device memory address in a host page table 121 stored in the host memory 116. The processor 104 may access the host page table 121 to transmit the SR-IOV device memory address to the virtual machine 122 for enabling and assigning the virtual function 146.

For example, the nested hypervisor 135 can assign virtual function 146a to the nested guest OS 144 of the nested virtual machine 140. Virtual page table entry 130a, which is indexed using the function number for virtual function 146a, can be updated by the virtual IOMMU 126 to include the virtual device memory address for virtual function 146a. The nested virtual machine 140 may use the virtual function 146a to interface with the SR-IOV device 108.

In another example, the nested hypervisor 135 can assign virtual function 146b to an application 148 executing within the container 142. Virtual page table entry 130b, which is indexed using the function number for virtual function 146b, can be updated by the virtual IOMMU 126 to include the virtual device memory address for virtual function 146b. The application 148 may use the virtual function 146b to interface with the SR-IOV device 108.

Although the above examples describe the host hypervisor 118 as performing certain steps and the IOMMU 110 as performing others, any number and combination of the components shown in FIG. 1 can implement any number and combination of the steps discussed herein. The computing device 102 can implement any number and combination of steps using any number and combination of suitable software (e.g., the guest OS 136, the host OS 120, or both). Although one nested virtual machine 140 and one container 142 are depicted, any number of virtual machines and containers may be included. Similarly, although two page table entries 114a-b and virtual page table entries 130a-b are depicted, any number of page table entries and virtual page table entries may be included.

Figure 2:
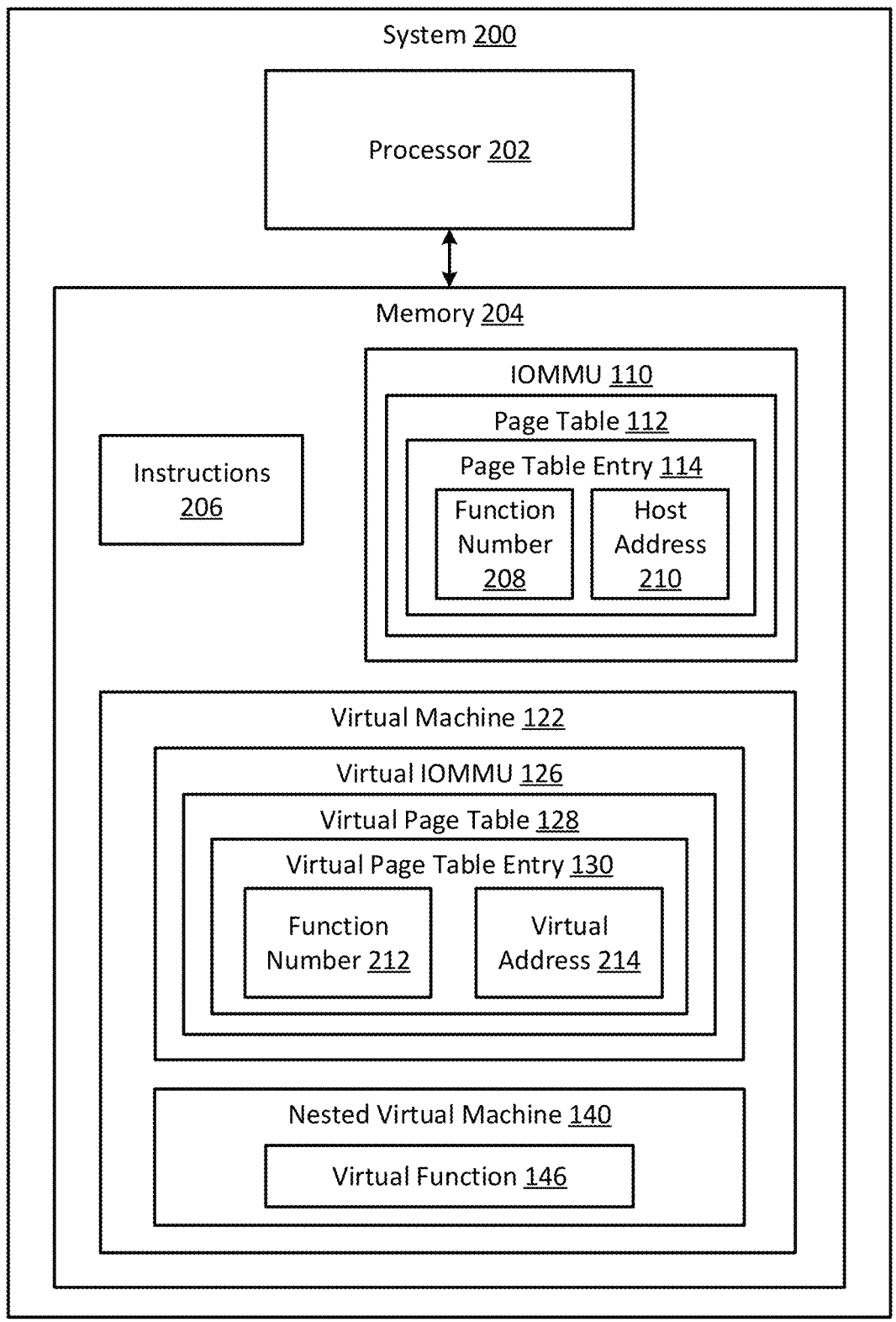
FIG. 2 is a block diagram of another example of a system for pre-allocating page table entries for virtual functions to provide virtual machine access to an SR-IOV device according to some aspects of the present disclosure.

FIG. 2 is a block diagram of another example of a system 200 for pre-allocating page table entries 114 for virtual functions 146 to provide virtual machine 122 access to an SR-IOV device 108 according to some aspects of the present disclosure. The system 200 includes a processor 202 communicatively coupled to a memory 204. In some examples, the processor 202 and the memory 204 can be the processor 104 and the memory 106, respectively, of FIG. 1.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. In some examples, at least some of the memory can include a medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the memory 204 can include device memory for an SR-IOV device 108 that is plugged into a PCI module (not pictured) of the system 200. The processor 202 may execute instructions 206 to query the SR-IOV device 108 to determine a maximum number of virtual functions 146 that can be supported by a physical function 138 for the SR-IOV device 108. The processor 202 can allocate a page table 112 in the IOMMU 110 that is associated with the physical function 138. The page table 112 can include a number of page table entries 114 that corresponds to the maximum number of virtual functions 146. The page table entries 114 can include a function number 208 for each potential virtual function 146. The processor 202 run a host hypervisor 118 that executes a virtual machine 122 that includes a virtual page table 128 with virtual page table entries 130 corresponding to the page table 112 with page table entries 114. The virtual page table entries 130 can include virtual function numbers 210 for potential virtual functions 146. The processor 202 can cause the virtual machine 122 to request a virtual function 146. The processor 202 can intercept and forward the request to the SR-IOV device 108. The processor 202 can transmit an SR-IOV device memory address 210 for the virtual function 146 to the virtual machine 122 for enabling the virtual function 146. The processor 202 can update the page table entry 114 to include the SR-IOV device memory address 210. In some examples, the processor 202 may translate the SR-IOV device memory address 210 into a virtual SR-IOV device memory address 214 to transmit to the virtual machine 122 for enabling the virtual function 146.

Figure 3:
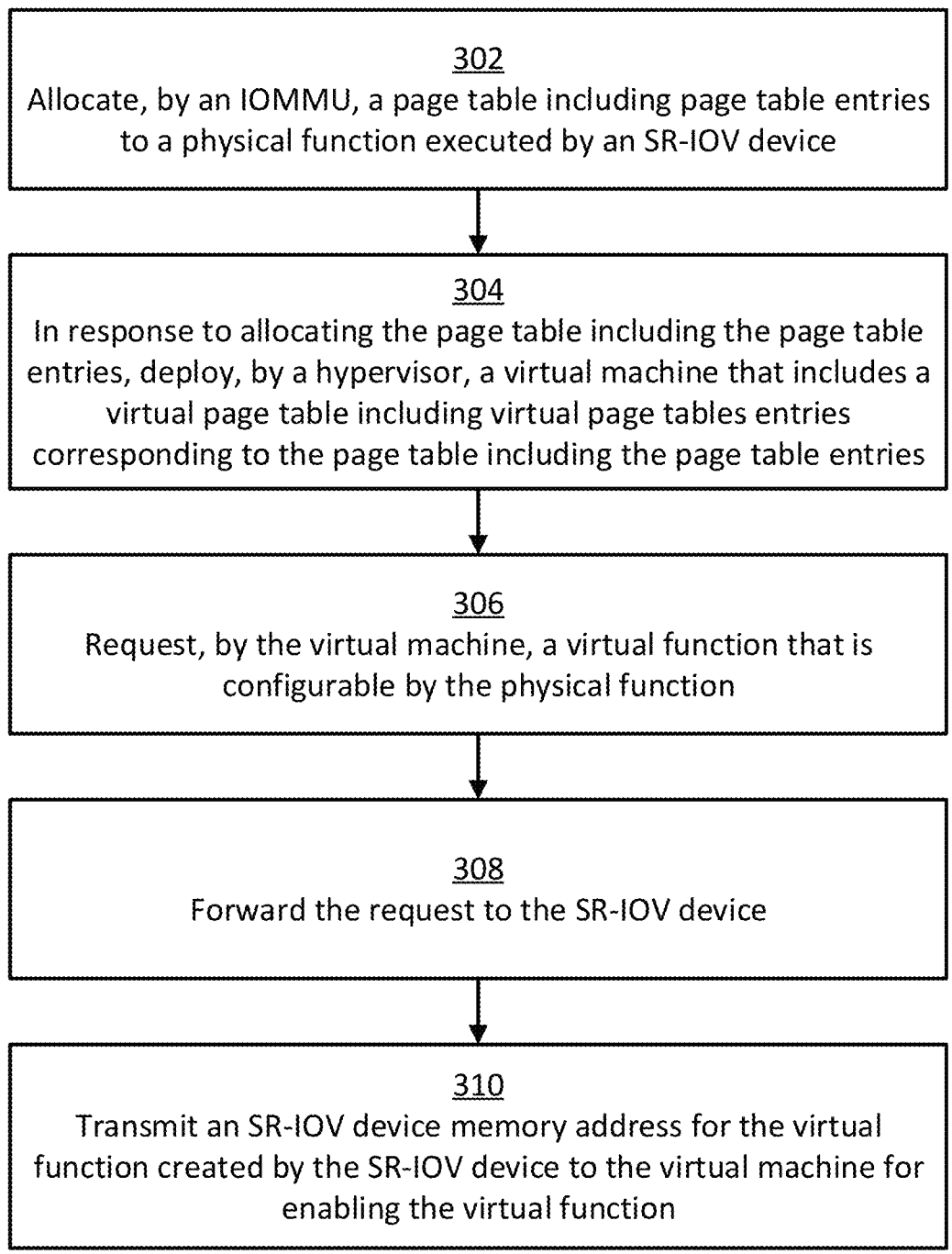
FIG. 3 is a flow chart of an example of a process for pre-allocating page table entries for virtual functions to provide virtual machine access to an SR-IOV device according to some aspects of the present disclosure.

In some examples, the processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIGS. 1-2.

At block 302, a page table 112 is allocated by the IOMMU 110 to a physical function 138 of an SR-IOV enabled PCI device, such as the SR-IOV device 108. The page table 112 includes one or more page table entries 114a-b. The page table entries 114a-b may be pre-allocated before virtual functions are created and discovered. In some examples, the number of page table entries 114a-b can be a maximum number of virtual functions 146a-b that are configurable by the physical function 138. In other examples, the number of page table entries 114a-b can be a portion of the maximum number of virtual functions 146a-b that are configurable by the physical function 138. In some examples, the number of page table entries 114a-b can be determined by querying the SR-IOV device 108. Each page table entry 114 may include a function number 212 that is associated with a potential virtual function 146.

At block 304, in response to allocating the page table 112 with the page table entries 114a-b, a virtual machine 122 may be deployed by a hypervisor, such as the host hypervisor 118. The virtual machine 122 may include virtualized resources, such as a virtual IOMMU 126 and a nested hypervisor 134. The virtual page table 128 and the virtual page table entries 130 can correspond to the pre-allocated page table 112 and page table entries 114 in the IOMMU 110.

At block 306, a virtual function 146 that is configurable by the physical function 138 is requested by the virtual machine 122. Because the virtual IOMMU 126 contains the pre-allocated virtual page table entries 130, the virtual machine 122 may be aware of memory available to create virtual functions 146. In some examples, the request may be forwarded to the virtual SR-IOV device in the virtual machine 122. At block 308, the request can be forwarded to the SR-IOV device 108. For example, the request may be intercepted by the host hypervisor 118 to prevent the virtual SR-IOV device from receiving the request. The host hypervisor 118 may forward the request to the SR-IOV device 108. Alternatively, the processor 104 can intercept and forward the request to the SR-IOV device 108.

At block 310, an SR-IOV device memory address 210 for the virtual function 146 requested by the virtual machine 122 can be transmitted to the virtual machine 122 for enabling the virtual function 146. For example, the SR-IOV device memory address 210 can be transmitted by the host hypervisor 118 or the processor 202. The page table entry 114 can be updated, such as by the IOMMU 110, to include the SR-IOV device memory address 210. In some examples, the SR-IOV device memory address 210 may be translated, by the host hypervisor 118 or the processor 202, into a virtual SR-IOV device memory address 214, and the virtual SR-IOV device memory address 214 can be transmitted to the virtual machine 122. The virtual IOMMU 126 may update the virtual page table entry 130 with the virtual SR-IOV device memory address 214. The virtual machine 122 may use the SR-IOV device memory address 210 or the virtual SR-IOV device memory address 214 to enable and assign the virtual function 146.

For example, the virtual function 146 may be assigned to a nested virtual machine 140 that is deployed by the nested hypervisor 134. The nested virtual machine 140 may execute the virtual function 146 via the virtual memory address 214 to access the SR-IOV device 108. For example, if the SR-IOV device 108 is a network interface card, the nested virtual machine 140 may use the virtual function 146 to send or receive data over a network via the network interface card. In some examples, the virtual machine 122 can remove or change the virtual function 146. For example, the virtual machine 122 can execute the nested hypervisor 134 to destroy the virtual function 146 assigned to the nested virtual machine, and can cause the virtual IOMMU 126 to remove the virtual memory address 214 from the virtual page table entry 130.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A system comprising:
a processor; and
a memory including instructions that are executable by the processor for causing the processor to:
  allocate, by an input-output memory management unit (IOMMU), a page table comprising a plurality of page table entries to a physical function executed by a single root input-output virtualization (SR-IOV) device;
  in response to allocating the page table comprising the plurality of page table entries, deploy, by a hypervisor, a virtual machine, the virtual machine comprising a virtual page table comprising a plurality of virtual page table entries corresponding to the page table comprising the plurality of page table entries;
  request, by the virtual machine, a virtual function that is configurable by the physical function;
  forward the request to the SR-IOV device; and
  transmit an SR-IOV device memory address for the virtual function created by the SR-IOV device to the virtual machine for enabling the virtual function.

2. The system of claim 1, wherein a number of the plurality of page table entries is a maximum number of virtual functions that are configurable by the physical function, and wherein the memory further includes instructions that are executable by the processor for causing the processor to query the SR-IOV device for the maximum number of virtual functions that are configurable by the physical function.

3. The system of claim 1, wherein the request is forwarded and the SR-IOV device memory address is transmitted by the hypervisor, and wherein the memory further includes instructions that are executable by the processor for causing the processor to:
  translate, by the hypervisor, the SR-IOV device memory address into a virtual SR-IOV device memory address for the virtual machine; and
  transmit the virtual SR-IOV device memory address to the virtual machine.

4. The system of claim 1, wherein the request is forwarded and the SR-IOV device memory address is transmitted by the processor, and wherein the memory further includes instructions that are executable by the processor for causing the processor to:
  translate the SR-IOV device memory address into a virtual SR-IOV device memory address for the virtual machine;
  store the SR-IOV device memory address and the virtual SR-IOV device memory address in a host page table; and
  access the host page table to transmit the virtual SR-IOV device memory address to the virtual machine.

5. The system of claim 1, wherein the memory further includes instructions that are executable by the processor for causing the virtual machine to assign the virtual function by:
  deploying, by a nested hypervisor executing within the virtual machine, a nested virtual machine within the virtual machine; and
  assigning, by the nested hypervisor, the virtual function to the nested virtual machine.

6. The system of claim 1, wherein the memory further includes instructions that are executable by the processor for causing the virtual machine to assign the virtual function by:
  deploying, by a nested hypervisor executing within the virtual machine, a container within the virtual machine; and
  assigning, by the nested hypervisor, the virtual function to an application executing within the container.

7. The system of claim 1, wherein the memory further includes instructions that are executable by the processor for causing the processor to:

in response to forwarding the request to the SR-IOV device, create, by the SR-IOV device, the virtual function for the virtual machine; and update, by the IOMMU, a page table entry of the plurality of page table entries associated with the virtual function with a function number and an SR-IOV device memory address for the virtual function.

8. A method comprising:

allocating, by an input-output memory management unit (IOMMU) of a computing device, a page table comprising a plurality of page table entries to a physical function executed by a single root input-output virtualization (SR-IOV) device;

in response to allocating the page table comprising the plurality of page table entries, deploying, by a hypervisor, a virtual machine, the virtual machine comprising a virtual page table comprising a plurality of virtual page table entries corresponding to the page table comprising the plurality of page table entries;

requesting, by the virtual machine, a virtual function that is configurable by the physical function;

forwarding the request to the SR-IOV device; and transmitting an SR-IOV device memory address for the virtual function created by the SR-IOV device to the virtual machine for enabling the virtual function.

9. The method of claim 8, wherein a number of the plurality of page table entries is a maximum number of virtual functions that are configurable by the physical function, and wherein the method further comprises querying, by a processor, the SR-IOV device for the maximum number of virtual functions that are configurable by the physical function.

10. The method of claim 8, wherein the request is forwarded and the SR-IOV device memory address is transmitted by the hypervisor, and wherein the method further comprises:

translating, by the hypervisor, the SR-IOV device memory address into a virtual SR-IOV device memory address for the virtual machine; and transmitting, by the hypervisor, the virtual SR-IOV device memory address to the virtual machine.

11. The method of claim 8, wherein the request is forwarded and the SR-IOV device memory address is transmitted by a processor, and wherein the method further comprises:

translating, by the processor, the SR-IOV device memory address into a virtual SR-IOV device memory address;

storing, by the processor, the SR-IOV device memory address and the virtual SR-IOV device memory address in a host page table; and accessing, by the processor, the host page table to transmit the virtual SR-IOV device memory address to the virtual machine.

12. The method of claim 8, wherein the method further comprises assigning, by the virtual machine, the virtual function by:

deploying, by a nested hypervisor executing within the virtual machine, a nested virtual machine within the virtual machine; and assigning, by the nested hypervisor, the virtual function to the nested virtual machine.

13. The method of claim 8, wherein the method further comprises assigning, by the virtual machine, the virtual function by:

deploying, by a nested hypervisor executing within the virtual machine, a container within the virtual machine; and assigning, by the nested hypervisor, the virtual function to an application executing within the container.

14. The method of claim 8, further comprising:

in response to forwarding the request to the SR-IOV device, creating, by the SR-IOV device, the virtual function for the virtual machine; and updating, by the IOMMU, a page table entry of the plurality of page table entries associated with the virtual function with a function number and the SR-IOV device memory address for the virtual function.

15. A non-transitory computer-readable medium comprising program code that is executable by a processor for causing the processor to:

allocate, by an input-output memory management unit (IOMMU), a page table comprising a plurality of page table entries to a physical function executed by a single root input-output virtualization (SR-IOV) device;

in response to allocating the page table comprising the plurality of page table entries, deploy, by a hypervisor, a virtual machine, the virtual machine comprising a virtual page table comprising a plurality of virtual page table entries corresponding to the plurality of page table entries;

request, by the virtual machine, a virtual function that is configurable by the physical function;

forward the request to the SR-IOV device; and transmit an SR-IOV device memory address for the virtual function created by the SR-IOV device to the virtual machine for enabling the virtual function.

16. The non-transitory computer-readable medium of claim 15, wherein a number of the plurality of page table entries is a maximum number of virtual functions that are configurable by the physical function, and wherein program code is executable to further cause the processor to query the SR-IOV device for the maximum number of virtual functions that are configurable by the physical function.

17. The non-transitory computer-readable medium of claim 15, wherein the request is forwarded and the SR-IOV device memory address is transmitted by the hypervisor, and wherein program code is executable to further cause the processor to:

translate, by the hypervisor, the SR-IOV device memory address into a virtual SR-IOV device memory address; and transmit, by the hypervisor, the virtual SR-IOV device memory address to the virtual machine.

18. The non-transitory computer-readable medium of claim 15, wherein the request is forwarded and the SR-IOV device memory address is transmitted by the processor, and wherein program code is executable to further cause the processor to:

translate the SR-IOV device memory address into a virtual SR-IOV device memory address for the virtual machine;

store the SR-IOV device memory address and the virtual SR-IOV device memory address in a host page table; and access the host page table to transmit the virtual SR-IOV device memory address to the virtual machine.

19. The non-transitory computer-readable medium of claim 15, wherein program code is executable to further cause the virtual machine to assign the virtual function by:

deploying, by a nested hypervisor executing within the virtual machine, a nested virtual machine within the virtual machine; and assigning, by the nested hypervisor, the virtual function to the nested virtual machine.

20. The non-transitory computer-readable medium of claim 15, wherein program code is executable to further cause the virtual machine to assign the virtual function by:
   deploying, by a nested hypervisor executing within the virtual machine, a container within the virtual machine; and
   assigning, by the nested hypervisor, the virtual function to an application executing within the container.

* * * * *